PROCESS FOR PRODUCTION OF LIQUID AMMONIUM POLYPHOSPHATE FERTILIZER WITH USE OF UREA TO FORM POLYPHOSPHATE

United States Patent Office 3,540,874
Patented Nov. 17, 1970

3,540,874
PROCESS FOR THE PRODUCTION OF
AMMONIUM POLYPHOSPHATE
John M. Stinson, Sheffield, Ala., assignor to Tennessee
Valley Authority, a corporation of the United States
Filed May 6, 1968, Ser. No. 726,681
Int. Cl. C05b 7/00
U.S. Cl. 71—29     6 Claims

ABSTRACT OF THE DISCLOSURE

Improved process for the production of high-analysis solid and liquid ammonium polyphosphate fertilizers of high $P_2O_5$ polyphosphate availability and water-solubility levels from wet-process phosphoric acid and ammonia. Small amounts of urea are added to effect and complement the conversions of orthophosphates to water-soluble and available short-chain polyphosphates.

Figure 1:
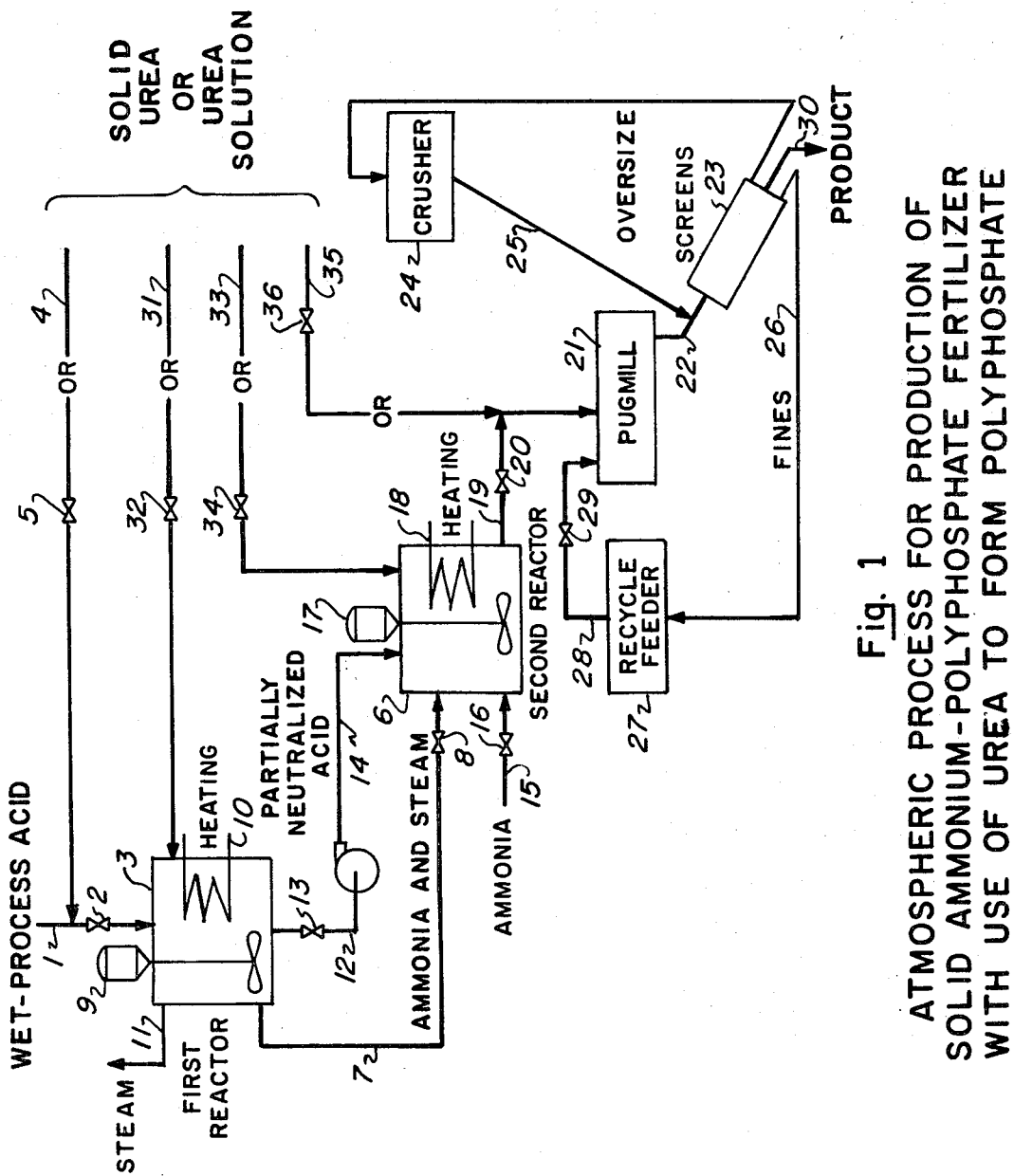

My invention relates to an improvement in liquid and solid fertilizers and an improved process of production; more particularly to a process for the manufacture of highly concentrated liquid and solid mixed fertilizers produced directly from the ammoniation of phosphoric acid, including acid of the wet-process type; and more particularly to the production of such highly concentrated liquid and solid mixed fertilizers wherein the ammoniation is of phosphoric acid of the wet-process type, and the previously required separate step of concentrating said wet-process phosphoric acid up to the range of superphosphoric acid is entirely eliminated; and still more particularly to a process wherein specific requirements and procedures heretofore prescribed as critical for the ammoniation procedure used and the type of agitation employed is substantially eliminated therefrom, while at the same time an ammonium polyphosphate-containing product is realized which contains both an unusually high ratio of ammonium polyphosphate to ammonium orthophosphate and in which the $P_2O_5$ values have an availability of substantially 100 percent. My process operates in such a manner as to produce ammonium polyphosphate material eminently suitable for use as both liquid and solid fertilizers which contain both high $P_2O_5$ availability (100 percent) and a high ratio of ammonium polyphosphate:ammonium orthophosphate under conditions where heretofore it has been possible to produce only materials wherein either the ratio of ammonium polyphosphate to ammonium orthophosphate was low and the $P_2O_5$ availability high, or wherein the ratio of ammonium polyphosphate to ammonium orthophosphate was high and the $P_2O_5$ availability low. I have found that I am able to practice my new, novel, and unique process for producing such ammonium polyphosphate-containing material being high in both $P_2O_5$ availability (99–100 percent) and ammonium polyphosphate under a variety of conditions wherein heretofore such a desirable material could not be produced without taking special precautions and procedures of either ensuring that specific and substantial amounts of ammonia are fixed in the neutralization step prior to the formation of substantial amounts of ammonium polyphosphate in the treated material and/or that extremely vigorous agitation be provided during such ammoniation procedure which heretofore dictated the use of highly specialized equipment of mechanical design requirements which tended to increase the cost of both capital and operating investments which oftentimes dictated and severely restricted the throughput capacity of said equipment. Thus, in my process I am able to overcome certain disadvantages of the prior art heretofore placed on the mechanical design and operating procedure for producing ammonium polyphosphate of the type described, and at the same time I am able to produce a superior material which is consistently higher in both available $P_2O_5$ content and ammonium polyphosphates than products resulting from teachings of the prior art.

Heretofore liquid mixed fertilizers having compositions similar to those of standard dry mixed fertilizers are well known in the industry and are increasing in popularity. Such solutions have the advantages over dry mixed fertilizers in that costs of evaporating water and bagging are eliminated and application to the soil is greatly simplified. Moreover, the use of liquid fertilizers eliminates difficulty due to segregation and caking often encountered in the storing of dry fertilizers.

However, liquid fertilizers have had some outstanding disadvantages. Raw-material costs have been relatively high and the solutions produced have, in the past, been so corrosive as to result in high maintenance and storage costs. The solutions also, in the past, have been limited to a maximum plant food content of about 33 percent by weight because experience has taught that concentration in excess of this amount always has resulted in crystallization and precipitation of salts. These disadvantages, in many instances, outweighted the benefits derived by elimination of the evaporation and bagging steps.

One of several recent breakthroughs in overcoming these disadvantages in liquid mixed fertilizers is taught and described in U.S. Pat. 2,950,961. Striplin et al. Striplin has discovered that he is able to prepare a liquid mixed fertilizer containing substantial values of both N and $P_2O_5$ in a process wherein he rapidly and intimately introduces ammonia and superphosphoricacid into a reaction vessel under controlled conditions. As is taught by Striplin, the superphosphoric acid utilized in his process is ammoniated in such a way that the resulting ammonium polyphosphate salts which comprise his liquid fertilizers are proportioned in his product in substantially the same dependent and proportional relationship as are the various species of polyphosphoric acids originally present in his superphosphoric acid constituent. It is believed that the retention of these species of nonequalibrated polyphosphoric acids as the ammonium salts thereof is beneficial in restraining the precipitation of salts in his product solution.

In another fairly recent breakthrough in overcoming the disadvantages of liquid mixed fertilizers produced by the prior-art methods, there is found in application Ser. No. 835,377, John G. Getsinger, assigned to the assignee of the present invention, the discovery that if phosphoric acid of the wet-process type is subjected to evaporating means, either at atmospheric or at reduced pressure, so as to condense the wet acid and raise its $P_2O_5$ content up to the range of approximately 60 to 80 percent $P_2O_5$, the formation of gelatinous precipitates which otherwise render wet-process phosphoric acid unusable for the preparation of high-analysis liquid mixed fertilizers are substantially sequestered. In addition, there is taught in said application that if wet-process phosphoric acid is so concentrated, it may then be subsequently ammoniated to form liquid mixed fertilizers in which the congeneric impurities originally present in said wet-process phosphoric acid are sequestered and caused to remain in solution, thereby eliminating the formation of said gelatinous precipitates. Substantially the same teachings wherein commercial grade wet-process phosphoric acid is concentrated and then subsequently ammoniated to form liquid mixed fertilizers is also found in U.S. Pat. 3,044,851, D. C. Young. As may be seen from the disclosure enumerated supra, it is now known in the art how to produce liquid mixed fertilizers having plant nutrient values comparable to many standard dry mixed fertilizers and, in addition, to the preparation of said liquid fertilizers by such means and in such forms so as to substantially overcome many of the disadvantages originally inherent in the production of liquid fertilizers prior to the Striplin disclosure. As may also be seen from a consideration of the economics involved, it is, in many cases, more highly desirable to produce such liquid mixed fertilizers by the ammoniation of concentrated wet-process superphosphoric acid rather than from the ammoniation of the cleaner, but more highly expensive, superphosphoric acid of the electric furnace type.

And in still another fairly recent breakthrough in overcoming some of the disadvantages of liquid and solid mixed fertilizers produced by the prior-art methods, there is found in U.S. Pats. 3,171,733, 3,228,752, 3,264,085, and 3,336,127, Hignett et al., assigned to the assignee of the present invention, the discovery of new compositions of matter and methods for their production which contain up to about 80 percent of their weight in the form of available plant food and which are produced by a process of directly reacting anhydrous ammonia with superphosphoric acid at elevated temperatures and pressures. These compositions of matter may either be directly applied to the soil as a solid fertilizer or may be shipped from the point of manufacture to the intended point of usage and then subsequently simply be dissolved in water, thereby effecting the production of high-analysis liquid mixed fertilizer suitable for application to the soil. In this teaching of Hignett et al., the feed material for the reactor is anhydrous ammonia and superphosphoric acid, either of the electric-furnace type or wet-process type. In his teaching, polyphosphate is present in the superphosphoric acid prior to ammoniation. This requirement necessitates, when said superphosphoric acid is derived from the leaching of phosphate rock by sulfuric acid, i.e., wet-process acid, of concentrating the ordinary or merchant-grade wet-process acid up to the superphosphoric range by means of a separate and fairly costly concentration step in that special equipment and materials of construction must be used to insure against the corrosive characteristics of acid so concentrated, and in the thermal requirements from the fuel to be used therein.

And in still another and most recent breakthrough in overcoming some of the disadvantages of liquid and solid mixed fertilizers produced by the prior-art methods, there is found in U.S. application Ser. No. 380,743, John G. Getsinger, assigned to the assignee of the present invention, now U.S. Pat. 3,382,059, the discovery of a process for the production of highly concentrated liquid and solid mixed ammonium polyphosphate fertilizers produced by the ammoniation of phosphoric acid of the wet-process type which overcomes certain of these disadvantages of the prior art and which will greatly influence an economic swing to the use of wet-process acid as the starting constituent rather than the more highly priced electric-furnnace type acid. He has developed a reliable, simple, and efficient method for the production of liquid and solid ammonium polyphosphate fertilizers by utilizing ordinary merchant-grade wet-process phosphoric acid in the $P_2O_5$ content range from about 50 to 58 percent by weight wherein the separate step of subjecting said acid to an evaporating step to increase its $P_2O_5$ content up to the "super" range (60–80 percent $P_2O_5$) is substantially eliminated, thereby greatly improving on the economics involved.

Further, Getsinger has found that, in carrying out his process for the manufacture of liquid and solid mixed fertilizers by the ammoniation of merchant-grade wet-process phosphoric acid, he can utilize the free heat of ammoniation to evaporate water and form polyphosphates rather than require the use of expensive heat from fossil fuel. His process accomplishes the two functions of ammoniation and concentration simultaneously instead of using two separate process steps. In addition, in his process the evaporation of water is from a relatively noncorrosive acid salt solution instead of from a highly corrosive acid, thus allowing the use of less expensive materials of construction when carrying out his process.

Subsequent to the original work by Getsinger, it has been discovered by his associates that although the two-stage ammoniation process of Getsinger is a new and useful tool in producing ammonium polyphosphates by a method which substantially eliminates the necessity of first separately concentrating wet-process phosphoric acid from merchant-grade strength, up to the superphosphoric acid range (about 60 to about 80 percent $P_2O_5$) it has certain limitations, the greatest of which perhaps is the degree of availability of the total $P_2O_5$ content of the ammonium polyphosphate produced thereby. It should be understood that $P_2O_5$ availability referred to is determined by standard procedures used in the fertilizer industry and defined in the Official Methods of Analysis of the Association of Official Agricultural Chemists, 10th edition, 1965, published by the Association of Official Agricultural Chemists, Washington, D.C.

It has been found that highly desirable products can be produced by the two-stage ammoniation process of Getsinger only when the feed acids contain relatively low metallic impurity contents or low polyphosphate contents. The metallic impurity content may be expressed as the $R_2O_3:P_2O_5$ mole ratio wherein $R_2O_3$ symbolizes the weight percent of the total of the two principal metallic impurities, iron and aluminum, reported as their oxides. For example, depending on the maximum operating temperature of the two-stage ammoniation process of Getsinger, we have found that the percentage of $P_2O_5$ availability falls off rapidly from substantially 100 percent when the $R_2O_3:P_2O_5$ mole ratio is greater than about 0.04. In the Getsinger process essentially all of the ammoniation and dehydration of the orthophosphoric acid occurs in the second stage; the first stage is used essentially to recover the ammonia evolved from the second stage in order to prevent an ammonia loss from the process. As a result, undesirable reactions occur with the metallic impurities present in the acid to form compounds that contain substantial portions of the $P_2O_5$ in a form that is unavailable to the growing plant. Thus, for example, in the application of M. R. Siegel et al., Ser. No. 658,962, filed Aug. 7, 1967, and assigned to the assignee of the present application, it has been shown that if the ammoniation is carried out in such a manner that, first, a high proportion of the ammonia is fixed while the polyphosphate content is low, then the final dehydration of the orthophosphates is converted to polyphosphates in such manner that the undesirable reactions that result in the formation of the unavailable $P_2O_5$ do not occur. As a result, Siegel et al. teach a process wherein they can obtain substantially 100 percent $P_2O_5$ availability when the $R_2O_3:P_2O_5$ mole ratio in the wet-process phosphoric acid feed is as great as about 0.1.

The value of the phosphorus content of phosphatic fertilizers is based only on those portions of the phosphate which are "available" to the growing plant and not on the total amount of phosphate that is present. In this country the amount of "available" phosphate present is defined by law on the basis of standardized procedures published in the Official Methods of Analysis of the Association of Official Agricultural Chemists. These procedures consist essentially in determining those portions of phosphate which are soluble in neutral ammonium citrate solution. Such soluble phosphates are referred to as "available" phosphates. Van Wazer (Phosphorus and Its Compounds, volume II, 1961, published by Interscience Publishers, Inc., New York) states in part that "this procedure attempts to duplicate the dissolving power exerted by the fluids in the root system of a living plant on the phosphates present in the soil. Obviously, such a procedure cannot be a perfect representation of availability since different plants, soils, and weather conditions cannot be taken into account. However, extensive agronomic studies have shown reasonably good correlation, and the procedure is accepted by the governmental agencies and the fertilizer industry in the United States."

A another example of improving upon the basic Getsinger process for insuring both a high degree of availability of the total $P_2O_5$ content of ammonium polyphosphate product, while at the same time holding the ratio of ammonium polyphosphate to ammonium orthophosphate in said material as high as possible, there is shown in application Ser. No. 715,786, R. S. Meline et al., and assigned to the assignee of the present invention, now abandoned, the further discovery that when utilizing the T in-line mixer in the pilot plant, as in the process of Siegel et al., the fixation of ammonia prior to dehydration and formation of the polyphosphate is most likely not the only essential mechanism of the reaction. Based on the results of the tests of Meline et al., they have concluded that fixation of ammonia, dehydration, and polyphosphate formation must occur simultaneously in their improvement over the basic Getsinger process and the improvement of Siegel et al. in order to yield products which consistently have the desired characteristics regardless of the $R_2O_3:P_2O_5$ mole ratio when using wet-process phosphoric acid as feed acid to their process. In addition to Meline et al.'s use of what amounts to an instantaneous agitation in their mixing T to insure intimate and immediate mixing at the point of fixation of the ammonia, which is also the point of formation of the polyphosphate, they also teach a criticality of disengaging water vapor trapped in the foam resulting in their process of ammoniation of wet-process phosphoric acid prior to any substantial cooling thereof to insure both high $P_2O_5$ availability and a high ratio of ammonium polyphosphate to ammonium orthophosphate in their product.

Thus, it may now be seen that, although the basic teaching of Getsinger is in fact a significant and substantial breakthrough which completely eliminates the necessity of first separately concentrating wet-process phosphoric acid from merchant-grade strength up to the superphosphoric acid range prior to the ammoniation thereof to produce ammonium polyphosphate products of highly desired characteristics, it has been also taught that, if the feed acid contains a high ratio of $R_2O_3:P_2O_5$, it is necessary either to first fix substantial amounts of ammonia prior to the formation in the product of substantial amounts of ammonium polyphosphate, or to provide both severe and substantial instantaneous mixing to ensure that fixation of ammonia, dehydration of wet-process phosphoric acid so fixed with ammonia, and polyphosphate formation therein occur simultaneously and that the foam resulting therefrom be mechanically treated to disengage water vapor trapped therein prior to any substantial cooling thereof in order to obtain products of the desired characteristics regardless of the impurity of the wet-process phosphoric acid fed to the system.

I have now discovered that although the two-stage ammoniation process of Getsinger is in fact a new and useful tool, and further, that the contributions of Siegel et al. and Meline et al., supra, possess considerable advantages thereover and in fact insure an improved product therefrom regardless of the $R_2O_3:P_2O_5$ ratio in the wet-process feed acid, I am able for the first time to use the relatively inexpensive equipment and procedure originally taught by Getsinger without the involved procedure of Siegel et al. or the mechanical requirements of Meline et al. to produce ammonium polyphosphate materials eminently suitable for the production of both liquid and solid mixed fertilizers of the type taught by Hignett et al., supra, which ammonium polyphosphate material exhibits substantially 100 percent $P_2O_5$ availabilities and at the same time have the theoretically highest obtainable ratio of ammonium polyphosphate to ammonium orthophosphate by the employment of a new, novel, unique, and improved method through the addition of a condensation agent added to the ammonium polyphosphate process under the conditions wherein a product from the hydrolysis of the condensation agent will act upon portions of the ammonium orthophosphate in the process so as to form therefrom ammonium polyphosphates.

The condensing agent that I employ in my process is urea.

Thus, it may be seen that my process takes a considerably different approach from prior-art methods of providing for the production of ammonium polyphosphate materials of both high polyphosphate and $P_2O_5$ availability levels from wet-process phosphoric acids having moderate to high impurity levels. In my process, since the condensing action of the urea is used to form at least portions of the polyphosphates, it is possible and desirable to operate at low temperatures where $P_2O_5$ availability problems are not encountered but at temperatures wherein I still obtain a product having a high polyphosphate content, wherein in the prior art this has not heretofore been possible. Also, as stated above, in my process the ammoniation procedure used and the type of agitation employed are not important or significant factors.

The use of urea as a condensing agent per se is not unknown. A rapid search of the literature has revealed several foreign patents or articles in which urea has been used as a condensing agent to form certain polyphosphates. For example, three patents issued to Monsanto Company[1, 2, 3] describe the production and use of long-chain water insoluble ammonium polyphosphates prepared by heating urea and ammonium orthophosphate or polyphosphate. In addition, studies by Chemische Werke Albert indicated they were able to produce ammonium polyphosphates by heating mixtures of urea and ammonium orthophosphate only when the mixtures contained high proportions of urea (N:P ratio in mixtures not less than 1:1).[4] Chemische Werke Albert produced potassium ammonium polyphosphates by heating a mixture of ammonium orthophosphate, potassium orthophosphate and urea.[5] However, the product contained a high proportion of long-chain polyphosphates and would not be water soluble or suitable for liquid fertilizer manufacture. Finally, Ueda[6, 7] apparently heated phosphoric acid and urea to form a mixture of ammonium polyphosphate and water-insoluble cyanuric acid with several subsequent steps involving water and ethyl alcohol addition to separate the polyphosphate. Gels formed, however, when the production of concentrated solutions were attempted with the polyphosphate.

Thus, although the use of urea as a condensing agent per se is not new, it will be readily appreciated by those skilled in the art that my new, novel, and unique method involving the use of urea as a condensing agent added to the ammonium polyphosphate process under the conditions where the hydrolysis product of the urea will act upon the ammonium orthophosphate therein to form ammonium polyphosphates therefrom is a substantial improvement and advancement of the art over the literature references just cited in that I have, for the first time, found that I am able to utilize small portions of urea (urea N:P mole ratios of 0.01 to 0.5) to condense phosphates in such a manner that the resultant polyphosphates are predominantly of short chain length which are highly water soluble and in a form suitable for use in liquid fertilizer production.

Thus, it can be readily seen that I have discovered a new and improved process for the ammoniation of wet-process phosphoric acid which, in addition to completely eliminating a separate step of concentrating said acid from merchant-grade strength up to the superphosphoric acid range, also completely eliminates special procedures

---

[1] Belgium Pat. 674,161, Dec. 22, 1965.
[2] Belgium Pat. 677,866, Sept. 15, 1966.
[3] Netherlands application 6409323, Aug. 13, 1964.
[4] German Pat. 1,216,856, May 5, 1966.
[5] Belgium Pat. 661,160, Sept. 16, 1965.
[6] Ueda, Shiro, Oyama, Keiji, and Koma, Kenju Kogyo Kagaku Zasshi 66 (5) 586–9 (1963).
[7] Ueda, Shiro, Nakagawa, Tatsuro, and Koma, Kenji Kogyo Kagaku Zasshi 66 (5) 589–92 (1963).

and techniques of first fixing prescribed and predetermined amounts of ammonia prior to the formation of ammonium polyphosphate and/or the provisions for rapid and instantaneous reaction and agitation between such acid and anhydrous ammonia to ensure simultaneous ammonia fixation, neutralization of acid, dehydration, and condensation for polyphosphate formation, together with disengagement of trapped water vapor from foam produced thereby, while at the same time obtaining a product of unusually high polyphosphate and $P_2O_5$ availability levels.

It is therefore an object of the present invention to produce improved stable fluid fertilizers of either clear solution or suspension type and solid mixed fertilizers containing upwards of about 55 percent total $(N+P_2O_5)$ in the fluid and about 75 percent total $(N+P_2O_5)$ in the solids by a process employing a condensing agent in the ammoniation of wet-process phosphoric acid, and from which process liquid fertilizers produced form substantially no precipitate upon standing and storage.

Another object of the present invention is to produce improved stable fluid fertilizers of either clear solution or suspension type and solid mixed fertilizers containing upwards of about 55 percent total $(N+P_2O_5)$ in fluid and about 75 percent total $(N+P_2O_5)$ in the solids by a process employing a condensing agent in the ammoniation of wet-process phosphoric acid, and which wet-process phosphoric acid incorporated into my method contains a maximum of approximately 58 percent $P_2O_5$ prior to incorporation therein, thereby eliminating the need for a separate concentrating step to increase the $P_2O_5$ content of said starting acid up to the superphosphoric acid range.

Still another object of the present invention is to produce improved stable fluid fertilizers of either clear solution or suspension type and solid mixed fertilizers containing upwards of about 55 percent total $(N+P_2O_5)$ in the fluid and about 75 percent total $(N+P_2O_5)$ in the solids directly from the ammoniation of merchant-grade wet-process phosphoric acid containing a maximum of approximately 58 percent $P_2O_5$ by a relatively simple and integrated process which simultaneously accomplishes the two functions of concentration and ammoniation, and which process further utilizes simultaneously along with said concentration and ammoniation functions the condensing action of urea incorporated therein such that ammonium polyphosphate is formed from the ammonium orthophosphate.

A further object of the present invention is to produce improved stable fluid fertilizers of either clear solution or suspension type and solid mixed fertilizers containing upwards of about 55 percent total $(N+P_2O_5)$ in the fluid and about 75 percent total $(N+P_2O_5)$ in the solids directly from the ammoniation of merchant-grade wet-process phosphoric acid containing a maximum of approximately 58 percent $P_2O_5$ by relatively simple and integrated process which simultaneously accomplishes the two functions of concentration and ammoniation, and which process further utilizes simultaneously along with said concentration and ammoniation functions the condensing action of urea incorporated therein such that ammonium polyphosphate is formed from the ammonium orthophosphate therefrom, said process characterized by the fact that the resulting product has, in addition to relatively high contents of nitrogen and $P_2O_5$, both high polyphosphate and high $P_2O_5$ availability levels.

A still further object of the present invention is to produce improved stable fluid fertilizers of either clear solution or suspension type and solid mixed fertilizers containing upwards of about 55 percent total $(N+P_2O_5)$ in the fluid and about 75 percent total $(N+P_2O_5)$ in the solids directly from the ammoniation of merchant-grade wet-process phosphoric acid containing a maximum of approximately 58 percent $P_2O_5$ relatively simple and integrated process which simultaneously accomplishes the two functions of concentration and ammoniation, and which process further utilizes simultaneously along with said concentration and ammoniation functions the condensing action of urea incorporated therein such that ammonium polyphosphate is formed from the ammonium orthophosphate therefrom, said process characterized by the fact that the resulting product has, in addition to relatively high contents of nitrogen and $P_2O_5$, both high polyphosphate and high $P_2O_5$ availability levels, and which process is further characterized by the fact that heretofore special requirements and restrictions for the ammoniation procedure used and the type of agitation employed, together with any requirement for water entrapped foam disengagement procedure is substantially eliminated.

Still further and more general objects and advantages of the present invention will appear from the more detailed description set forth below, it being understood, however, that this more detailed description is given by way of illustration and explanation only and not by way of limitation, since various changes therein may be made by those skilled in the art without departing from the true spirit and scope of the present invention.

My invention, therefore, together with further objects and advantages thereof, will be better understood from a consideration of the following description taken in connection with the accompanying drawings in which:

FIG. 1 is a flowsheet of a two-stage process for producing primarily solid ammonium polyphosphate containing materials according to my method which have the desired characteristics enumerated supra, wet-process phosphoric acid, from a source not shown, is fed through line 1 and any suitable means 2 for controlling the rate of flow into a reaction zone comprising vessel 3. In one modification of my process, solid urea or concentrated urea solution, from a source not shown, is added via line 4 and means 5 for controlling the rate of flow to line 1. Ammonia and steam from a reaction zone comprising vessel 6 is fed into vessel 3 through line 7 and means 8 for controlling the rate of flow. Vessel 3 is equipped with a motor-driven agitator 9 running at such speed as to secure rapid and intimate mixing of the acid, urea ammonia, and steam. Heating coils 10 are located within vessel 3 and may be disposed in a baffle-like arrangement to increase the degree of agitation resulting from the action of agitator 9. Principally steam escapes through line 11. Partially neutralized acid is discharged from vessel 3 via line 12 and any suitable means 13 for controlling the rate of flow through pump 14 into a reaction zone comprising vessel 6. Anhydrous ammonia, from a source not shown, is fed into vessel 6 through line 15 and means 16 for controlling the rate of flow. Vessel 6 is equipped with a motor-driven agitator 17 running at such speed as to secure rapid and intimate mixing of the partially neutralized acid and anhydrous ammonia to keep the resulting mixture in vigorous agitation. Heating coils 18 are located within vessel 6 and may be disposed in a baffle-like arrangement to increase the degree of agitation resulting from the action of agitator 17. The product from reactor vessel 6 is discharged as a melt through line 19 and any suitable means 20 for controlling the rate of flow into a granulator 21, where it is subjected to agitation by stirring means, not shown. It has been found that agitation in vessel 21 is required in order for the molten material to set up into hard granules. The resulting hard granules travel from vessel 21 via line 22 to a screening means generally illustrated as screens 23 and crusher 24. The crushed oversize material is returned to the screens via line 25. The fine material is returned to a recycle feeder 27 via line 26 and then to the vessel 21 through line 28 and any suitable means 29 for controlling the rate of flow. The granular product from this process can be stored for future use or bagged and shipped for further use through line 30. Several modifications of my process can be done by adding solid urea or urea solution, from a source not shown, either via line 4 and any suitable means 5 for controlling the rate of flow to line 1, as previously described, or via line 31 and any suitable means 32 for controlling the rate of flow to vessel 3, or via line 33 and any suitable means 34 for controlling the rate of flow to vessel 6, or via line 35 and any suitable means 36 for controlling the rate of flow to line 19.

Figure 2:
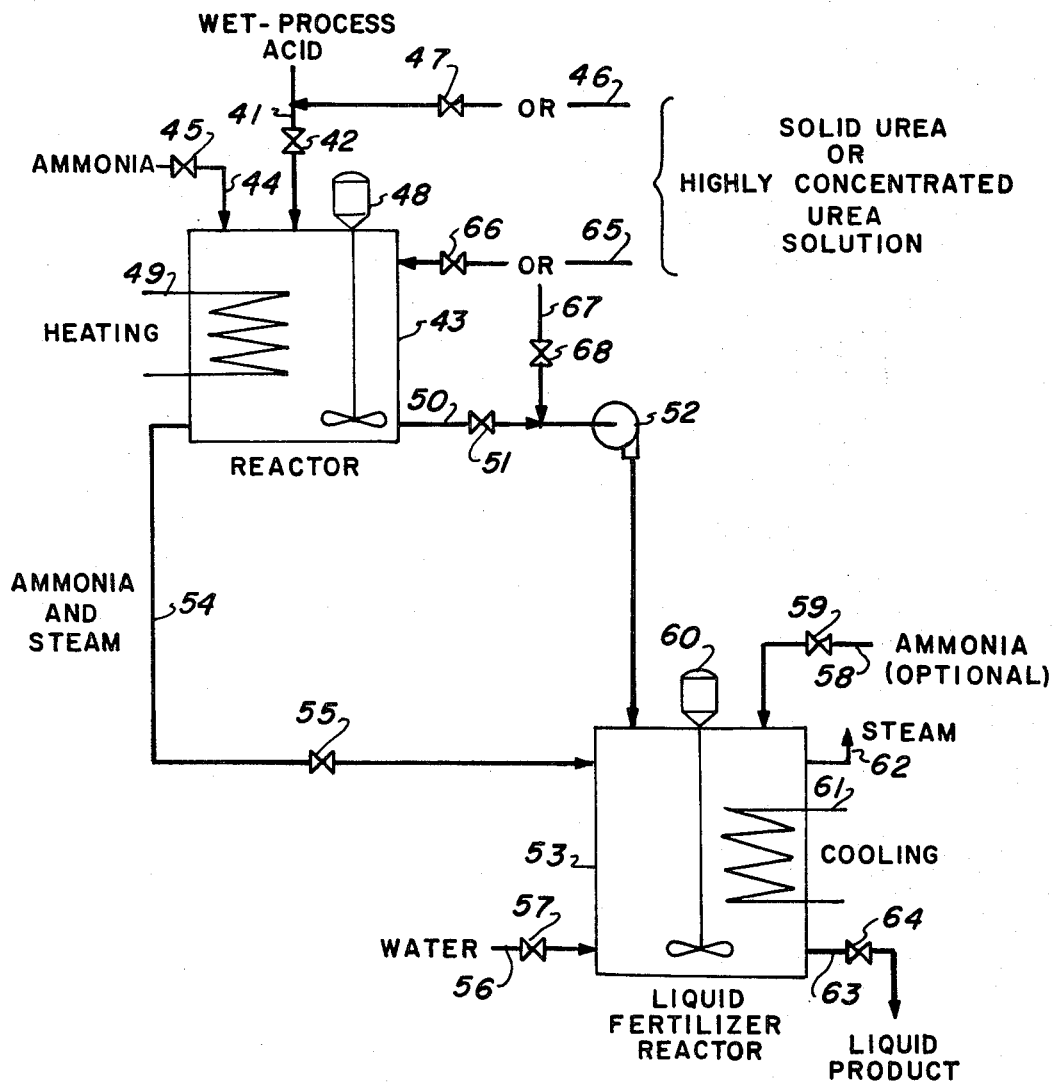

FIG. 2 is a flowsheet for the embodiment of my process which may be utilized where the only products desired are liquid fertilizers. Wet-process phosphoric acid, from a sources not shown, is fed through line 41 and any suitable means 42 for controlling the rate of flow into a reaction zone comprising vessel 43. Anhydrous ammonia, from a source not shown, is fed into vessel 43 through line 44 and means 45 for controlling the rate of flow. Solid urea or highly concentrated urea solution, from a source not shown, is added via line 46 and means 47 for controlling the rate of flow to line 41. Vessel 43 is equipped with a motor-driven agitator 48 running at such speed as to secure rapid and intimate mixing of the acid, urea, and ammonia to keep the resulting mixture in vigorous agitation. Heating coils 49 are located within vessel 43 and may be disposed in a baffle-like arrangement to increase the degree of agitation resulting from the action of agitator 48. Melt is discharged from vessel 43 via line 50 and any suitable means 51 for controlling the rate of flow through pump 52 into a reaction zone comprising vessel 53. Ammonia and steam from vessel 43 is fed into vessel 53 through line 54 and any suitable means 55 for controlling the rate of flow. Water, from a source not shown, is fed into vessel 53 via line 56 and any suitable means 57 for controlling the rate of flow. Optionally, ammonia, from a source not shown, can be fed into vessel 53 through line 58 and any suitable means 59 for controlling the rate of flow. Vessel 53 is equipped with a motor-driven agitator 60 running at such speed as to secure rapid and intimate mixing of the melt, able means 66 for controlling the rate of flow, or to line 50 via line 67 and any suitable means 68 for controlling the rate of flow.

Referring now more specifically to FIG. 1, my experimental studies have shown that solid urea may be incorporated successfully in the feed acid, in partially neutralized acid, or in the melt discharged from the second-stage reactor. Also, it is anticipated that concentrated urea solution may be used and that the urea source could be added to the second stage. Results of small-scale studies given in Table I below show that urea was not hydrolyzed when solid urea was added to wet-process acid or partially neutralized acid at temperatures as high as 250° F. and at a retention time of 30 minutes. Therefore, when the urea is added at these locations, the hydrolysis would not occur until the second stage where it is desired.

In carrying out the process, the first and second stages may be operated as suggested by Getsinger, supra, while preferably maintaining an operating temperature in the second stage of about 425° F. At this temperature no supplemental heat is required if the acid is preheated to 250° F. The polyphosphate content without urea addition would be about 30 percent and no $P_2O_5$ availability problems would be encountered even with acids of high impurity content. Sufficient urea would be added to result in an increase in the proportion of $P_2O_5$ in polyphosphate form to about 60 percent maximum. At higher polyphosphate levels, the solid products become too sticky to store well; however, liquids of higher polyphosphate contents could be prepared.

Alternatively, the process shown in FIG. 1 may be used to produce ammonium polyphosphate liquids either directly by adding the molten material from the second reactor to a liquid fertilizer reactor where the appropriate quantities of ammonia and water are added or by dissolving solid granulated product in ammonia and water.

TABLE I.—INCORPORATION OF SOLID UREA IN UNAMMONIATED AND PARTIALLY NEUTRALIZED WET-PROCESS ACID

| | Mixing conditions | | | Chemical composition | | | | | | | |
|---|---|---|---|---|---|---|---|---|---|---|---|
| | | | | Percent by weight | | | | | Percent of Total $P_2O_5$ | | |
| Sample description | G. urea [1] 100 g., $P_2O_5$ | Temperature, °F. | Time at temperature, min. | Nitrogen | | | Total $P_2O_5$ | Lb. free $NH_3$/unit $P_2O_5$ | Poly $P_2O_5$ | Avail. $P_2O_5$ | Urea decomposed? |
| | | | | Total | Urea | Biuret | | | | | |
| Acid A [1] | 0 | | | | | | 54.4 | | | | |
| Acid A+urea | 8.5 | 80 | 30 | 2.2 | 2.4 | | | 0 | | | No. |
| Do | 8.5 | 250 | 30 | 2.3 | 2.3 | | | 0 | <1 | | No. |
| Partially neutralized acid A | 0 | 250 | | 3.7 | | | 55.2 | 1.6 | <1 | 100 | |
| Partially neutralized Acid A+urea | 8.5 | 250 | >30 | 5.9 | 2.5 | 0.2 | 53.3 | 1.6 | <1 | 100 | No |
| Acid D [2] | 0 | | | | | | 54.0 | | | | |
| Acid D+urea | 8.5 | 250 | <2 | 2.1 | 2.3 | | 53.5 | 0 | <1 | | No. |
| Do | 8.5 | 250 | 30 | 2.2 | 2.2 | | 55.6 | 0 | <1 | | No. |

[1] Urea was anhydrous reagent-grade material.
[2] Analyses of acids made from Florida phosphate rock are as follows:

| | Analysis, percent by wt. | | | | | Mole ratios | |
|---|---|---|---|---|---|---|---|
| Acid | Total $P_2O_5$ | $Fe_2O_3$ | $Al_2O_3$ | $SO_3$ | F | $R_2O_3$: $P_2O_5$ | $Fe_2O_3$: $Al_2O_3$ |
| A | 54.4 | 2.3 | 1.2 | 0.8 | 0.4 | 0.068 | 1.2 |
| D | 54.0 | 1.6 | 1.5 | 0.7 | 1.0 | 0.065 | 0.68 | water, ammonia, and steam to keep the resulting mixture in vigorous agitation. Cooling coils 61 are located within vessel 53 and may be disposed in a baffle-like arrangement to increase the degree of agitation resulting from the action of agitator 50. Principally steam escapes through line 62. After a suitable mixing time, the liquid product will be discharged from reaction vessel 53 through line 63 into storage or shipping containers. The rate of discharge from reaction vessel 53 can be measured by any suitable means 64. Several modifications of my process can be made by adding solid urea or highly concentrated urea solution, from a source not shown, either via line 46 and any suitable means 47 for controlling the rate of flow to line 41, as previously described, or directly to vessel 43 via line 65 and any suit- Referring now more specifically to FIG. 2, if liquid fertilizers are the only products desired, an even simpler process utilizing my condensation approach is feasible; this simplified process is carried out in a single-stage reactor as shown in FIG. 2. The urea (either anhydrous or in the form of a concentrated solution) is added either to the feed acid, to the first-stage reactor, or to the melt discharged from the reactor. This melt is then fed to a liquid fertilizer reactor where sufficient ammonia and water is added to produce the desired liquid.

With both processes shown in FIGS. 1 and 2, supplemental materials such as ammonium nitrate or potash may be added to vary the product grade or ratio. Also micronutrient sources may be added. A suspending or gelling clay could be added during the liquid manufacture to produce suspension- or slurry-type fertilizers if desired.

In order that those skilled in the art may better understand how the present invention can be practiced and more fully and definitely understood, the following examples of my new, novel, and unique method and variations thereof which I have used to circumvent and alleviate the necessity of the restrictions taught and disclosed to be necessary in the prior art for the production of ammonium polyphosphates having the indicated highly desirable characteristics of high levels of available $P_2O_5$ and ammonium polyphosphate are given by way of illustration and not by way of limitation.

EXAMPLE I

In the initial exploratory tests made wherein urea was added in the ammonium polyphosphate process under conditions where hydrolysis of the urea would form polyphosphates, the mechanisms of such reaction are illustrated by the following equations.

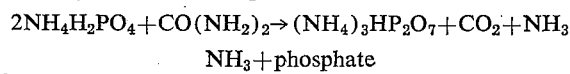

$NH_3$+phosphate for example,

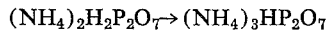

Therefore I reasoned that, if merchant-grade acid were ammoniated at a low temperature where no $P_2O_5$ availability problems are encountered, it would be possible to increase the proportion of polyphosphate $P_2O_5$ present to the desired level (50 percent) by urea condensation without encountering $P_2O_5$ availability problems. The urea added would be hydrolyzed in the conversion of ortho- to polyphosphate. Carbon dioxide and ammonia would be evolved from hydrolysis of the urea but the ammonia would be fixed by the phosphate.

In these early tests, sufficient urea was added to the melt to supply 5 pounds per 100 pounds of melt. This is the calculated amount required to increase the polyphosphate content of the product by 20 percentage points assuming that all of the urea is completely hydrolyzed (see above equations). The cost of the added urea would be about $1 per ton of product if credit were allowed for the ammonia fixed and assuming costs of $50 and $100, respectively, per ton of nitrogen in the ammonia and urea.

The melt was produced by single-stage ammoniation of acid (80° F.) of 56.1 percent $P_2O_5$ content and 0.066 $R_2O_3$:$P_2O_5$ mole ratio in a 3-inch-diameter reactor. This reactor was equipped with an agitator which was composed of four turbines and rotated at 600 r.p.m. The acid and ammonia were introduced under the surface of the melt through separate spargers. Operation was carried out at a temperature of 425° F. and a retention time of 8 minutes. In one test (122-2) the urea was added to the melt as it was solidified during agitation in a 1-gallon bucket. The total mixing time was 10 minutes and the temperature of the mixture decreased from about 400° to 300° F. during the mixing. In another test (122-3A) the urea was first placed in the bucket, the melt poured on top, and then agitation begun. The temperatures of the mixtures were not measured in this test. By both procedures, severe foaming occurred on contact of the melt with urea, which indicated hydrolysis of the urea.

Prior to addition of urea, the grade of the ammonium polyphosphate was 12-61-0 (4.8 lbs. $NH_3$/unit of $P_2O_5$) and 44 percent of its $P_2O_5$ was in polyphosphate form. This proportion of $P_2O_5$ as polyphosphate was somewhat higher than anticipated at this reaction temperature. Essentially all of the $P_2O_5$ was in available form.

Reaction of the ammonium polyphosphate with urea increased the proportion of polyphosphate $P_2O_5$ the desired 20 percentage points (to 64 percent) as a result of condensing orthophosphate to pyrophosphate. The proportion of $P_2O_5$ in forms more condensed than pyrophosphate remained the same. The product degree of ammoniation increased from 4.8 to 5.6-5.7 pounds per unit of $P_2O_5$ (product grade of about 14-60-0) by fixation of the ammonia released in the urea hydrolysis. This degree of ammoniation is the highest that has been obtained in the study of the direct production of ammonium polyphosphate from merchant-grade acids and was that calculated possible if all of the ammonia produced in the urea hydrolysis was fixed by the phosphate. The proportion of available $P_2O_5$ present (99-100 percent) was not affected by the addition of the urea. The amount of water-soluble $P_2O_5$ was increased (99 and 100 percent vs. 95 percent) by the urea addition. No urea was found in the products. The biuret content of the products was low (0.5 percent).

The products obtained with the urea addition were light in weight and porous. They were somewhat sticky and amorphous but in about the same condition as previous products of this high polyphosphate content. Microscopic and X-ray examinations failed to reveal the compounds present.

A highly concentrated and satisfactory liquid of 11-37-0 grade was made by dissolving the products with urea in ammonium hydroxide and adjusting the pH to 6 with gaseous ammonia. This liquid did not salt out on storage at 32° F. or 80° F. for 30 days. A liquid of only 10-34-0 grade was the maximum grade that could be satisfactorily produced from the product made without urea because of the lower proportion of polyphosphate in this product. All liquids were black in color as made; after standing for a day, the carbonaceous material settled and left an opaque green supernatant. However, the presence of this carbonaceous material is common in liquids made from wet-process acids and its presence does not interfere with use of the liquid.

In other tests, urea-ammonium nitrate solution (32 percent N), gaseous ammonia, and water were added to the product made with urea to produce a 19-19-0 grade liquid, and urea-ammonium nitrate solution (32 percent N), gaseous ammonia, potassium chloride, and water were added to produce an 8-8-8 grade liquid fertilizer. The impurities were well sequestered in all the liquid fertilizers and none of the liquids salted out during storage at 32° F. or 80° F. for 30 days.

Further results and operating conditions in these tests are shown in Table II below.

TABLE II.—PRODUCTION OF AMMONIUM POLYPHOSPHATE FROM WET-PROCESS ACID: USE OF UREA TO FORM POLYPHOSPHATE

| Test No. | No urea added, 122-3 | Urea added to supply 5 lb./100 lb. of melt | | Theoretically possible [1] |
|---|---|---|---|---|
| | | 122-3A | 122-2 | |
| Reaction [2] conditions: | | | | |
| Temperature, °F | 425 | [3] | | |
| Retention time, min | 8 | [3] | | |
| Composition of product: | | | | |
| Percent by weight: | | | | |
| Total N | 12.0 | 13.8 | 14.0 | 14.1 |
| Urea N | | Nil | Nil | 0 |
| Total $P_2O_5$ | 61.1 | 60.0 | 59.7 | 60.3 |
| Lb. $NH_3$/unit of $P_2O_5$ | 4.8 | 5.6 | 5.7 | 5.7 |
| Percent of total $P_2O_5$ as: | | | | |
| Polyphosphate $P_2O_5$ [4] | 44 | 64 | 64 | 64 |
| Available $P_2O_5$ | 99 | 99 | 100 | |
| W.S. $P_2O_5$ | 95 | 100 | 99 | |
| $P_2O_5$ distribution by paper chromatography, percent of total $P_2O_5$: | | | | |
| Orthophosphate | 52 | 36 | | |
| Polyphosphates | 48 | 64 | | |
| Pyrophosphate | 40 | 55 | | |
| More condensed polyphosphates | 8 | 9 | | |

[1] Calculated possible if all $NH_3$ formed by hydrolysis is fixed.
[2] Molten ammonium polyphosphate made in single-stagd. open-top 3-inch-diameter reactor with acid produced at TVA and which contained 56.1% $P_2O_5$ (0.066 $R_2O_3$: $P_2O_5$ mole ratio).
[3] Temperature of mixture decreased from 400° (when melt added to urea) to 300° F. during 10-minute mixing period.
[4] By A.O.A.C. direct available procedure 2.037(a)(1).

EXAMPLE II

In this series of tests which were performed shortly after that described in Example I the urea was added in three different manners; (1) to ammonium polyphosphate melt under conditions that might be possible in pugmill operation, (2) to cold (80° F.) merchant-grade acid prior to ammoniation, and (3) to partially neutralized acid at 250° F. to simulate its addition to the first stage of a two-stage process. This proportion of urea added (8.5 lb./100 lb. $P_2O_5$) was sufficient to increase the proportion of polyphosphate $P_2O_5$ present by 20 percentage points if all the urea is reacted. These studies, described in detail below, showed that satisfactory products of high polyphosphate and availability levels were made by al three procedures with acids of 0.55 or 0.068 $R_2O_3:P_2O_5$ mole ratios. Generally about 50 percent of the $P_2O_5$ in the products was in polyphosphate form. Essentially all of the $P_2O_5$ in an available form and the proportion in water-soluble form was high (97–100 percent). Products made by similar procedures but without urea addition contained 25 to 35 percent of $P_2O_5$ in a polyphosphate form.

Urea added to ammonium polyphosphate melt

In this series of tests the urea was added to ammonium polyphosphate melt produced by two-stage continuous ammoniation of merchant-grade wet-process acid of 0.055 $R_2O_3:P_2O_5$ mole ratio with improved mixing of the partially neutralized acid and ammonia in the in-line mixing T. The use of the T was not necessary for successful operation but was used since it was already installed in the pipe work. The first-stage reactor was oeprated at a temperature of 290° F. and 3-minute retention time and the second-stage reactor at 425° F. and a 10-minute retention time. The off-gases from the second stage were recycled to the first stage. All the supplemental heat necessary to maintain this temperature was supplied by preheating the feed acid to a temperature of about 190° F. The ammonium polyphosphate melt was discharged from the reactor into a gallon bucket, solid urea (80° F.) added at melt temperatures of 400°, 370°, and 350° F. and the mixtures agitated with a propeller-type mixer until the mixtures had cooled to about 300° F.; at this temperature they were too viscous for further mixing. Mixing times ranged from 13 to 4 minutes. Test conditions and results are shown in Table III below.

TABLE III.—USE OF UREA TO FORM POLYPHOSPHATE: INCORPORATION OF UREA IN AMMONIUM POLYPHOSPHATE MELT [1]

| Test No. X-134 | 1, 1B and 3 | 3A | 1A | 1C |
|---|---|---|---|---|
| First-stage reactor: | | | | |
| Operating temperature, °F | 290 | 290 | 290 | 290 |
| Retention time, min | 3 | 3 | 3 | 3 |
| Second-stage reactor: | | | | |
| Operating temperature, °F | 430 | 430 | 430 | 430 |
| Retention time, min | 10 | 10 | 10 | 10 |
| Urea incorporation: | | | | |
| Lb. urea incorporated/100 lb. melt | 0 | 5 | 5 | 5 |
| Lb. urea incorporated/100 lb. $P_2O_5$ | 0 | 8.5 | 8.5 | 8.5 |
| Temperature of incorporation, °F | | 400 | 370 | 350 |
| Mixing time, min | | 13 | 7 | 4 |
| Product: | | | | |
| Analysis, percent by wt.: | | | | |
| Total N | 11.8 | 13.7 | 13.6 | 13.6 |
| $NH_3$ N | | 13.2 | 12.8 | 12.6 |
| Urea N | | 0.6 | 0.7 | 1.1 |
| Biuret | | 0.6 | 0.5 | 0.7 |
| Total $P_2O_5$ | 58.5 | 56.6 | 57.2 | 57.1 |
| Lb. $NH_3$/unit $P_2O_5$ | 4.9 | 5.6 | 5.5 | 5.3 |
| Percent of total $P_2O_5$ as: | | | | |
| Orthophosphate | 66 | 47 | 49 | 53 |
| Polyphosphate | 34 | 53 | 51 | 47 |
| Available $P_2O_5$ | 99 | 100 | 99 | 99 |
| W.S. $P_2O_5$ | 91 | 100 | 98 | 97 |
| Urea reacted, percent of input [2] | | 73 | 69 | 51 |

[1] Melt produced by the two-stage continuous ammoniation of merchant-grade wet-process acid (55.4% $P_2O_5$, $R_2O_3:P_2O_5$ mole ratio 0.055).
[2] Based on quantity of urea added and urea-N analysis of product.

Products made without urea had a grade of 11–58–0 and contained 34 percent of the $P_2O_5$ as polyphosphate. Essentially all of the $P_2O_5$ was available and 91 percent was water soluble. When the urea was combined with ammonium polyphosphate melt at temperatures of 370° or 400° F., about 70 percent of the urea reacted and the proportion of $P_2O_5$ in a polyphosphate form increased by 17 to 19 percentage points to give products of about 13–57–0 grade which contained 53 and 51 percent of the $P_2O_5$ in polyphosphate form. The $P_2O_5$ availability remained high (99–100%) and the $P_2O_5$ water-solubility increased to 98–100 percent. When urea was added to melt at 350° F. the proportion of $P_2O_5$ in a polyphosphate form increased by only 13 percentage points. Only half of the urea reacted; however, the polyphosphate level of the product (47 percent of total $P_2O_5$) was close to the desired level. Essentially all (99 percent) of the $P_2O_5$ in this product (13–57–0) was in available form and 97 percent in water-soluble form. All products had fairly low biuret contents (0.5–0.7 percent).

All products were hard and brittle on solidification. The degrees of ammoniation of products made with urea were 0.4 to 0.6 pound of ammonia per unit of $P_2O_5$ (4.9–5.0 versus 5.3–5.6) greater than those made without urea. Also, they were higher than those that were made at 450° F. in two-stage operation of the direct process and which contained 50 percent of the $P_2O_5$ as polyphosphate (4.9–5.2 lb. $NH_3$/unit of $P_2O_5$). Calculations based on the quantity of urea added and product composition indicated that in the products made with urea all of the ammonia formed in hydrolysis of the urea was fixed in the products.

Urea added to acid

Before these tests, mixtures of solid reagent-grade urea and acid were heated to ensure that hydrolysis of the urea would not occur prior to the final ammoniation step. Premature hydrolysis of the urea when water was also present would not be desired since polyphosphate would not be formed. Adding urea in the proportion desired (8.5 lb./100 lb. $P_2O_5$ equivalent to 5 lb./100 lb. of ammonium polyphosphate) to two acids of about 0.065 and 0.068 $R_2O_3:P_2O_5$ mole ratios and then heating the mixtures at 250° F. for 30 minutes did not result in urea hydrolysis. No foaming was noted and urea:$P_2O_5$ ratios in the mixtures after heating were very close to those expected without hydrolysis. These conditions were more severe than anticipated in actual operation. Data from these tests are shown in Table I above.

In the continuous test of the ammoniation of a mixture of the solid urea and acid, the urea was first mixed at 80° F. with about 9 liters of merchant-grade acid of 0.068 $R_2O_3:P_2O_5$ mole ratio. This mixture was then fed at 80° F. to a 3-inch-diameter reactor where it was ammoniated at a temperature of 425° F. and at a retention time of 8 minutes. Since preheated acid was not used, supplemental heat was supplied by torches directly to the reactor in lieu of this heat. An in-line mixing T was not used in the process and, instead, the acid and ammonia were fed through separate spargers to the bottom of the reactor.

The discharge from the reactor which was foamy was collected in a gallon bucket and agitated while it cooled until solidification occurred. The solid product was hard and brittle and had a grade of 12–60–0 (4.9 lb. $NH_3$/unit $P_2O_5$); 41 percent of the $P_2O_5$ was in a polyphosphate form and essentially all of the $P_2O_5$ was in available and water-soluble forms. The biuret content was low (0.2 percent). A product made under the same conditions, but without the addition of urea to the feed acid, contained only 25 percent of the $P_2O_5$ in a polyphosphate form.

In the test with added urea, 96 percent of the urea reacted but most of the ammonia formed in the hydrolysis was evidently evolved as the degree of ammoniation of this product was not significantly higher than that of the no-urea product (4.9 v. 4.7 lb. free $NH_3$/unit of $P_2O_5$). Likely this ammonia was not fixed because of the relatively high temperature at which condensation occurred. In a continuous process, this ammonia could be recovered by passing the gases to a first stage. Data from these tests are shown in Table IV below.

TABLE IV.—USE OF UREA TO FORM POLYPHOSPHATES: UREA INCORPORATED IN FEED ACID AND IN PARTIALLY NEUTRALIZED ACID

| Test No. IP | 159-1 | 146-3 | 95-4 | 147-2 |
|---|---|---|---|---|
| Feed to Reactor Identification | Acid [1] | Acid [1] and urea | Partially neutralized acid | Partially neutralized acid and urea |
| Urea added, lb./100 lb. $P_2O_5$ | | 8.5 | | 8.5 |
| Composition of feed, percent by wt.: | | | | |
| Total N | | 2.1 | 5.9 | 5.9 |
| Urea N | | 2.1 | | 2.5 |
| Biuret | | 0.2 | | 0.2 |
| Total $P_2O_5$ | | 52.2 | 59.7 | 53.3 |
| $H_2O$ (Karl Fischer) | | 21.1 | 6.0 | 14.6 |
| Lb. $NH_3$/unit $P_2O_5$ | | 0 | 2.4 | 1.6 |
| Percent of total $P_2O_5$ as: | | | | |
| Orthophosphate | | | 100 | |
| Polyphosphate | | | <1 | |
| Available | | | 100 | 100 |
| Temperature, °F | 80 | 80 | 300 | 250 |
| Reactor: | | | | |
| Feed rates of acid or acid plus urea, g./min | 170 | 178 | 174 | 167 |
| Lb. $NH_3$/unit of $P_2O_5$ | 7 | 7 | 5 | 7 |
| Operating temperature, °F | 425 | 425 | 425 | 425 |
| Retention time, min | 8 | 8 | 8 | 8 |
| Product: | | | | |
| Percent by wt.: | | | | |
| Total N | 11.6 | 12.3 | 12.5 | 12.4 |
| Urea N | | 0.1 | | 0 |
| Biuret | | 0.2 | | 0.3 |
| Total $P_2O_5$ | 59.6 | 60.9 | 60.4 | 62.3 |
| Lb. $NH_3$/unit $P_2O_5$ | 4.7 | 4.9 | 5.0 | 4.8 |
| Percent of total $P_2O_5$ as: | | | | |
| Orthophosphate | 75 | 59 | 64 | 41 |
| Polyphosphate | 25 | 41 | 36 | 59 |
| Available | 100 | 100 | 100 | 100 |
| Water soluble | 100 | 99 | 97 | 100 |
| Urea reacted [2], percent of input | | 96 | | 100 |

[1] Acid contained 54.4% $P_2O_5$ and had an $R_2O_3$:$P_2O_5$ mole ratio of 0.068.
[2] Based on quantity of urea added and urea-N analysis of product.

Urea added to partially neutralized acid

Referring back to Table I, preliminary tests showed that urea was not hydrolyzed by heating a mixture of solid urea and a partially neutralized acid (0.068 $R_2O_3$:$P_2O_5$ mole ratio; 1.6 lb. $NH_3$/unit of $P_2O_5$) to a temperature of 250° F. for 30 minutes. No foaming was noted. In this process then urea hydrolysis would occur as desired during the final ammoniation step.

In this continuous test about 9 liters of merchant-grade acid of 0.068 $R_2O_3$:$P_2O_5$ mole ratio was first ammoniated to 1.6 lb. $NH_3$/unit $P_2O_5$ and then kept at a temperature of 250° F. on a hot plate to simulate melt discharged from the first-stage reactor. Reagent-grade urea was then mixed with the partially neutralized acid to give the mixture containing 8.5 lb./100 lb. $P_2O_5$ (equivalent to 5 lb. of urea/100 lb. of ammonium polyphosphate). A stainless steel beaker was used as the mixing vessel and the retention time in the beaker was about 5 minutes. The urea-preneutralized acid mixture was then fed to the 3-inch-diameter reactor described earlier where it was ammoniated at a temperature of 425° F. and at a retention time of 8 minutes. The discharged melt was slightly foamy, but foaming soon stopped when the product was collected in a sample bucket. The melt was agitated while it cooled until solidification occurred.

The solid product was hard and brittle and had a grade of 12–62–0 (4.8 lb. $NH_3$/unit $P_2O_5$); 59 percent of the $P_2O_5$ was in polyphosphate form. All of the $P_2O_5$ was in available and water-soluble forms. Also, the biuret content was low (0.3 percent). A product made in an earlier test under similar conditions, but without the addition of urea, contained only 36 percent of the $P_2O_5$ in a polyphosphate form. All of the urea reacted in the test with added urea but the ammonia formed in the hydrolysis was lost presumably because of the higher temperature at which condensation occurred. However, this ammonia could be recovered in a first stage. The degree of ammoniation of the product with urea was about the same as that without urea (4.8 vs. 5.0 lb. free $NH_3$/unit of $P_2O_5$).

Liquids of nominal 10–34–0 grade in which the impurities were well sequestered were made by dissolving the products made with urea addition in ammonium hydroxide and adding gaseous ammonia to increase the pH to 6. The liquids were black in color when made, but after storage at room temperature for a few days, the carbonaceous material settled leaving an opaque green supernatant.

The results of the above tests in this example show that the urea could be combined in either of the three described methods.

After sifting and winnowing through the data, results, and operations of my new, novel, improved, and unique method for both the single-stage and two-stage operations for directly ammoniating merchant-grade wet-process phosphoric acid and incorporating in my method the use of urea as a condensing agent to act upon the ammonium orthophosphate in said feed acid to convert substantial portions thereof to ammonium polyphosphates and in which method there is no requirement for fixing predetermined amounts of ammonia prior to the formation of said ammonium polyphosphates therein, nor is there any requirement for attempting to achieve almost instantaneous reaction between the feed acid and anhydrous ammonia with the subsequent need for disengaging from the foam therefrom the water trapped therein, together with completely eliminating a separate concentration step for converting the merchant-grade wet-process phosphoric acid to superphosphoric acid of the wet-process type, and which method produces highly desirable ammonium polyposphate materials having substantially 100 percent available $P_2O_5$, I now present acceptable and preferred ranges of operating the variables of method in Table V below.

TABLE V.—PRODUCTION OF AMMONIUM POLYPHOSPHATE BY SINGLE- AND TWO-STAGE AMMONIATION: ACCEPTABLE AND PREFERRED RANGES OF VARIABLES

| | Solid product two-stage process | | Liquid single-stage process |
|---|---|---|---|
| Reaction variables | First stage | Second stage | |
| $P_2O_5$ content of acid, percent by wt.: | | | |
| Limits | ([1]) | | ([1]) |
| Preferred | 53–55 | | 53–55 |
| Acid temperature, °F.: | | | |
| Limits | 60–boiling | | 60–boiling |
| Preferred | 200–250 | | 200–250 |
| $R_2O_3$:$P_2O_5$ mole ratio of acid: | | | |
| Limits | 0.001–0.10 | | 0.001–0.10 |
| Preferred | 0.001–0.07 | | 0.001–0.07 |
| Reaction temperature, °F.: | | | |
| Limits | 200–400 | 300–500 | 350–500 |
| Preferred | 250–350 | 400–425 | 400–425 |
| Retention time, min.: | | | |
| Limits | 1–180 | 1–180 | 1–180 |
| Preferred | 2–15 | 2–15 | 2–15 |
| Pressure, p.s.i.a.: | | | |
| Limits | 0.5–1,000 | 0.5–1,000 | 0.5–1,000 |
| Preferred | 14.7–16 | 14.7–16 | 14.7–16 |
| Degree of ammoniation, lb. free $NH_3$/unit of $P_2O_5$: | | | |
| Limits | 0.1–3.0 | 2.5–7.5 | 2.5–7.5 |
| Preferred | 1.5–2.5 | 4.0–5.5 | 4.0–5.5 |
| Melt temperature on urea addition, °F.: | | | |
| Limits | | 350–500 | 350–450 |
| Preferred | | 400–425 | 400–425 |

[1] 50 to 58% with wet-process orthophosphoric acid and 50 to 69% with electric furnace orthophosphoric acid.

While I have shown and described particular embodiments of my invention, modifications and variations thereof will occur to those skilled in the art. I wish it to be understood therefore that the appended claims are intended to cover such modifications and variations which are within the true scope and spirit of my invention.

What I claim as new and desire to secure by Letters Patent of the United States is:

1. In an improved process for the production of ammonium polyphosphates in a form suitable for the manufacture of high-analysis stable solid and liquid mixed fertilizers, said ammonium polyphosphates derived from the ammoniation of wet-process phosphoric acid containing between about 1 and about 10 weight percent of metallic and other incidental impurities, said impurities comprising principally iron and aluminum and normally causing the formation of precipitates and gelatinous bodies in ammonium phosphates, which comprises the steps of introducing commercial grade wet-process phosphoric acid containing in the range from about 50 to about 58 percent $P_2O_5$ into a first reaction vessel; simultaneously introducing into said first reaction vessel the offgas from a later mentioned second reactor vessel, said offgas from said second reactor vessel comprising vapors of water and unreacted ammonia, and said offgas introduction into said first reactor vessel causing the heating and preneutralization of the wet-process phosphoric acid introduced therein; simultaneously removing a portion of the partially neutralized wet-process phosphoric acid from said first reactor vessel and introducing said stream into a second reactor vessel; simultaneously introducing a stream of anhydrous ammonia into said second reactor vessel; maintaining in said second reactor vessel a melt of ammonium polyphosphates resulting from the reaction of said stream of anhydrous ammonia and said stream of partially neutralized wet-process phosphoric acid; continuously agitating the melt of ammonium polyphosphate in said second reactor vessel and causing the intimate mixing of the streams of partially neutralized wet-process phosphoric acid and anhydrous ammonia with said melt; and withdrawing as product from said second reactor vessel a melt of ammonium polyphosphates suitable for the subsequent preparation of solid and liquid mixed fertilizers; the improvement in combination therewith for ensuring that the ammonium polyphosphate product is in a form such that at least 99 percent of the ammonium polyphosphate is readily available to growing plants, said improvement comprising the additional step of introducing a stream of urea, in the urea N:P mole ratio of from about 0.01 to 0.50, into contact with the reaction constituents of said process, said reaction constituents consisting of said wet-process phosphoric acid, said anhydrous ammonia, said offgas, and said partially neutralized wet-process phosphoric acid, said introduction of said stream of urea into contact with said reaction constituents effecting at least in part and complementing:

(1) the conversion of orthophosphates to essentially completely water-soluble polyphosphates, and
(2) the formation of relatively short chain length acyclic polyphosphates, thereby eliminating the $P_2O_5$ availability problems normally associated with acyclic polyphosphates of relatively long chain lengths.

2. The process of claim 1 wherein the temperature of the acid fed to the first-stage reaction vessel is in the range from about 60° F. to about its boiling point, wherein the $R_2O_3:P_2O_5$ mole ratio of the acid fed to the first-stage reaction vessel is in the range from about 0.001 to about 0.10, and wherein the variables, reaction temperature, retention time, pressure, and degree of ammoniation as pounds $NH_3$ per unit of $P_2O_5$ (unit of $P_2O_5$ equals 20 pounds) in the first- and second-stage reactor vessels are as follows:

|  | First-stage reaction vessel | Second-stage reaction vessel |
| --- | --- | --- |
| Reaction temperature, °F | 200–400 | 300–500 |
| Retention time, min | 1–180 | 1–180 |
| Pressure, p.s.i.a | 0.5–1,000 | 0.5–1,000 |
| Degree of ammoniation lb. of $NH_3$/unit $P_2O_5$ (1 unit of $P_2O_5$=20 lb.) | 0.1–3.0 | 2.5–7.5 |

3. The process of claim 2 wherein said variables are as follows:

|  | First-stage reaction vessel | Second-stage reaction vessel |
| --- | --- | --- |
| Reaction temperature, °F | 250–350 | 400–425 |
| Retention time, min | 2–15 | 2–15 |
| Pressure, p.s.i.a | 14.7–16 | 14.7–16 |
| Degree of ammoniation lb. of $NH_3$/unit $P_2O_5$ (1 unit of $P_2O_5$=20 lbs.) | 1.5–2.5 | 4.0–5.5 |

4. In an improved process for the production of improved stable, liquid mixed ammonium polyphosphate fertilizer solutions containing upwards of about 55 percent ($N+P_2O_5$) directly from orthophosphoric acid and anhydrous ammonia, which comprises the steps of simultaneously introducing into a closed reaction vessel a stream of wet-process orthophosphoric acid containing in the range from about 50 to about 58 percent $P_2O_5$ together with a stream of anhydrous ammonia; maintaining in said reaction vessel a melt of ammonium polyphosphates resulting from the reaction of said stream of anhydrous ammonia and said stream of orthophosphoric acid; continuously agitating said melt of ammonium polyphosphate in said reaction vessel and causing the intimate mixing of the incoming streams of said orthophosphoric acid and anhydrous ammonia with said melt; withdrawing from said reaction vessel a portion of said melt of ammonium polyphosphates and introducing same into a liquid mixed fertilizer solution tank, together with a stream of aqueous medium; simultaneously introducing into said liquid mixed fertilizer solution tank the offgases from said closed reaction vessel, said offgases comprising steam and unreacted ammonia; continuously agitating the resulting liquid mixed fertilizer solution in said liquid mixed fertilizer solution tank; and withdrawing a portion of the resulting liquid mixed fertilizer solution from said liquid mixed fertilizer solution tank as product, said product characterized by the fact that it contains, in addition to ammonium orthophosphate, substantial portions of ammonium pyrophosphate, ammonium tripolyphosphate, and ammonium polyphosphates more highly condensed than said ammonium tripolyphosphate; the improvement in combination therewith for ensuring that the ammonium polyphosphate solution is in a form such that at least 99 percent of the ammonium polyphosphates therein are readily available to growing plants, said improvement comprising the additional step of introducing a stream of urea, in the urea N:P mole ratio of from about 0.01 to about 0.50 into contact with the reaction constituents of said process, said process reaction constituents consisting of said wet-process orthophosphoric acid, said anhydrous ammonia, said melt of ammonium polyphosphates, said introduction of said stream of urea into contact with said reaction constituents effecting at least in part and complementing:

(1) the conversion of orthophosphates to essentially completely water-soluble polyphosphates, and
(2) the formation of relatively short chain length acyclic polyphosphates, thereby eliminating the $P_2O_5$ availability problems normally associated with acyclic polyphosphates of relatively long chain lengths.

5. The process of claim 4 wherein the variables, acid temperature, $R_2O_3:P_2O_5$ mole ratio of acid, reaction temperature, retention time, pressure, and degree of ammoniation as pounds $NH_3$ per unit of $P_2O_5$ (unit of $P_2O_5$ equals 20 pounds) in the closed reaction vessel are as follows:

Acid temperature, °F.: 60 boiling.
$R_2O_3:P_2O_5$ mole ratio of acid: 0.001–0.10.
Reaction temperature, °F.: 350–500.
Retention time, min.: 1–180.
Pressure, p.s.i.a.: 0.5–1000.

Degree of ammoniation lb. of $NH_3$/unit $P_2O_5$ (1 unit of $P_2O_5$=20 lb.): 2.5–7.5.

6. The process of claim 5 wherein said variables are as follows:
  Acid temperature, °F.: 200–250.
  $R_2O_3$:$P_2O_5$ mole ratio of acid.: 0.001–0.07.
  Reaction temperature, °F.: 400–425.
  Retention time, min.: 2–15.
  Pressure, p.s.i.a.: 14.7–16.
  Degree of ammoniation lb. of $NH_3$/unit $P_2O_5$ (1 unit of $P_2O_5$=20 lb.): 4.5–5.5.

References Cited

UNITED STATES PATENTS

| | | | |
|---|---|---|---|
| 3,244,500 | 4/1966 | Stinson et al. | 71—34 X |
| 3,382,059 | 5/1968 | Getsinger | 71—34 |

J. L. DE CESARE, Primary Examiner

U.S. Cl. X.R.

71—34